March 29, 1955     I. G. CRUCKSHANK     2,704,922
CONTROL MEANS FOR FLUID DISTRIBUTION SYSTEM
Filed Oct. 14, 1949     2 Sheets-Sheet 1
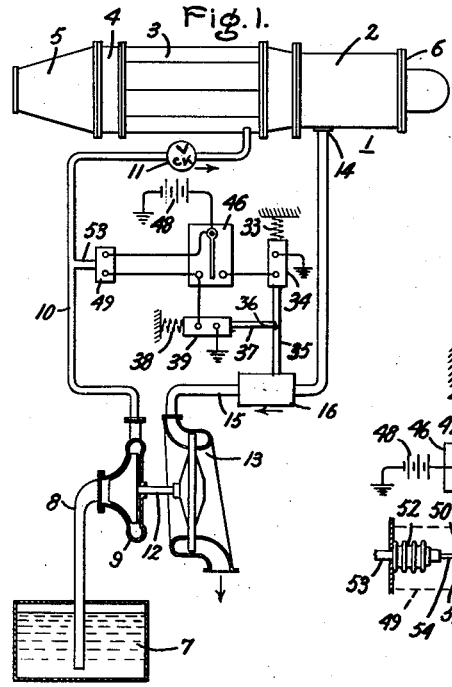
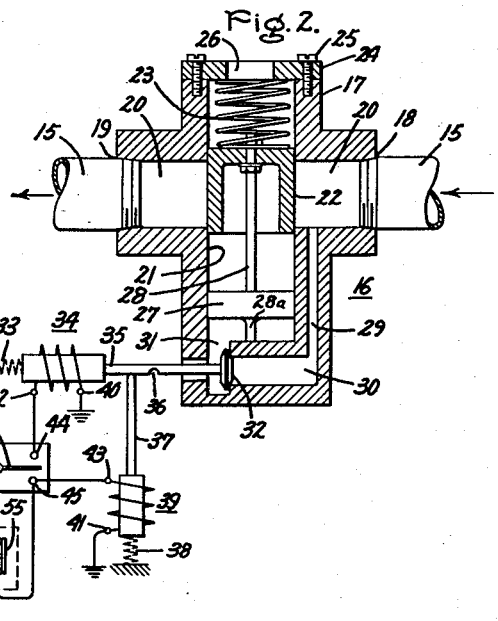
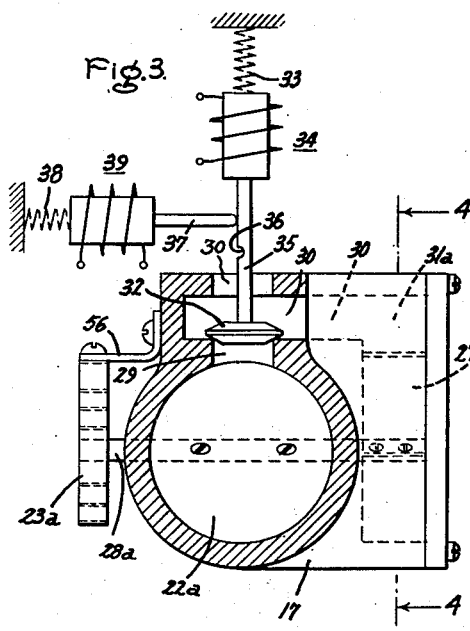
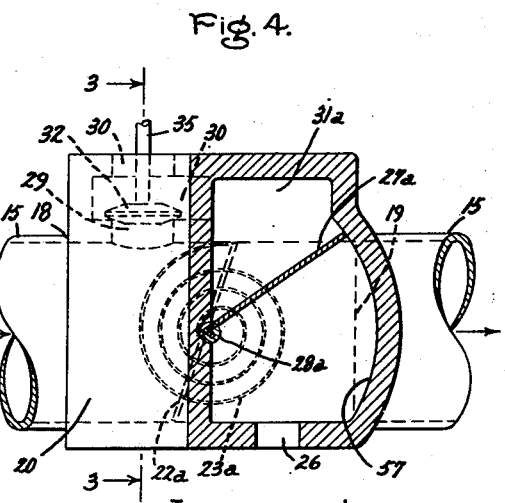
Inventor:
Ira G. Cruckshank,
by Ernest C. Britton
His Attorney.

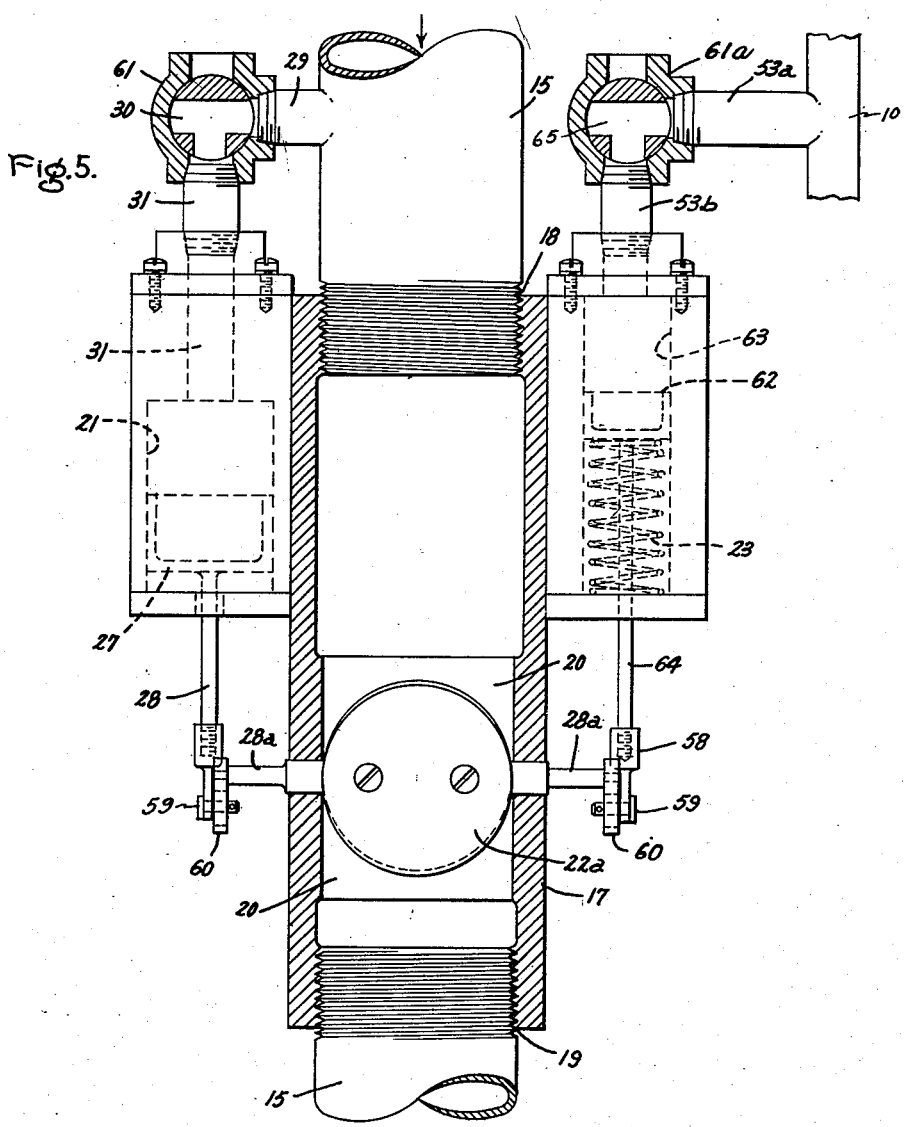

United States Patent Office 2,704,922
Patented Mar. 29, 1955

2,704,922

CONTROL MEANS FOR FLUID DISTRIBUTION SYSTEM

Ira G. Cruckshank, Malden, Mass., assignor to General Electric Company, a corporation of New York Application October 14, 1949, Serial No. 121,327

5 Claims. (Cl. 60—39.09)

This invention relates to fluid distribution systems and more particularly to regulating devices for controlling the flow of fluids in such systems.

In fluid injection systems for augmenting the output of a gas turbine powerplant, pumping means are provided for supplying injection fluid under pressure. The details of such a system are described in a co-pending application of Joseph S. Alford, Neil Burgess, and Ira G. Cruckshank, Serial Number 121,328 filed October 14, 1949, now Patent No. 2,551,229, and assigned to the assignee of the present application. As indicated in the above-mentioned application, it is desirable to provide turbine-driven centrifugal-type pumping means adapted for operation at high rotational speeds since the required pumping capacity can be provided with minimum physical dimensions of the pumping means and the driving means therefor. This is a particularly important feature in aircraft service where weight and bulk msut be kept to a minimum. Since the physical dimensions of the pumping means and the driving means are minimized, the rotational elements of these means will have relatively low inertia and will therefore reach destructive overspeeds very quickly if they are permitted to operate without load.

Accordingly, it is an object of this invention to provide novel and improved means for protecting the driving and pumping means in a fluid injection system against operation after the injection fluid has been completely consumed.

Another object is to provide new and improved apparatus for automatically controlling the flow of a fluid.

Still another object is in the provision of an improved shut-off device which is automatic and reliable in operation, and quick acting.

Other objects and advantages will become apparent from the following description taken in connection with the accompanying drawings in which Fig. 1 is a diagrammatic representation of a fluid distribution system for gas turbine powerplants provided with flow control means in accordance with the invention; Fig. 2 is a view partly in section, illustrating one type of flow control apparatus and operating means therefor in accordance with the invention; Fig. 3 is another view partly in section, looking in the direction of arrows 3—3 in Fig. 4, illustrating another embodiment of the invention; Fig. 4 is a view partly in section, looking in the direction of arrows 4—4 in Fig. 3; Fig. 5 is a view partly in section, showing still another embodiment of the invention.

Referring now to Fig. 1, a gas turbine powerplant suitable for the propulsion of aircraft is indicated generally at 1. Powerplants of this type usually comprise a compressor section 2, a combustor section 3, a turbine section 4, and an exhaust section 5 arranged in series flow relation to keep the weight and diameter of the powerplant to a minimum. Air is drawn from the atmosphere through an inlet 6 into the compressor section 2, which compresses the air, thus increasing its pressure and temperature. This air under increased pressure and temperature then passes to the combustor section 3 where fuel is introduced and burned with the air to produce gases under pressure and at a still higher temperature. These gases, leaving the combustor section under pressure and at an elevated temperature, serve as motive fluid for driving the turbine which extracts at least sufficient power from the hot gases to drive the compressor and various accessories (not shown) such as fuel and lubrication pumps. The remaining power is available for propulsion of the aircraft. After passing through the turbine the hot gases are discharged into the exhaust section 5 and then to the atmosphere. The mechanical details of such powerplants are described with greater particularity in United States Patent 2,432,359—Streid and in co-pending applications in the name of Alan Howard, Serial Number 506,930, filed October 20, 1943, now Patent 2,479,573, and Serial Number 541,565, filed June 22, 1944, and assigned to the assignee of the present application.

Suitable injection fluid is stored in reservoir 7 from which it is conveyed to the combustor section of the powerplant by inlet conduit 8, pump 9, and discharge conduit 10. As previously indicated, the air in the combustor section of the powerplant is under pressure since it has been compressed by compressor section 2. To prevent flow of combustor air through conduit 10 and the pump 9 during periods when the water injection system is not in operation, a check valve 11 is included in conduit 10. Pump 9 is provided with a shaft 12 which is connected to a turbine 13. The compressor section 2 is provided with a discharge connection or port 14, from which a portion of the air flowing through the compressor can be diverted to provide motive fluid for driving turbine 13. This air under pressure is conveyed to the turbine 13 by a conduit 15 connected to the turbine and to discharge port 14. After passing through the turbine, the air is discharged directly to the atmosphere.

A valve 16 is provided in conduit 15 for controlling the operation of the turbine. Referring now to Figs. 1–2, valve 16 comprises a body or casing 17 having inlet and discharge ports 18, 19 connected by a fluid passage 20. Casing 17 is provided with a cylindrical bore portion 21 having an axis normal to and intersecting the axis of passage 20. A piston type valve 22 is slidably supported in the cylindrical bore 21. A compression spring 23 is provided for biasing valve 22 to closed position for preventing the flow of fluid from inlet 18 to discharge port 19. A plate 24 for retaining spring 23 is secured to casing 17 by any convenient type of securing means as for example, by threaded fastening 25. An opening 26 is provided in retaining plate 24 for establishing communication between the ambient atmosphere and the upper surface of valve 22. A fluid motor piston 27 serves as an operating means for valve 22 and is connected thereto by a rod 28. An extension 28a of rod 28 prevents piston 27 from touching the lower end portion of the cylindrical bore 21. Communication is established between inlet port 18 and the under surface of piston 27 by passages 29—31 in casing 17. A valve 32 is slidably supported in casing 17 for isolating passage 29 and the righthand portion of passage 30 and at the same time establishing communication between the underside of piston 27 and the atmosphere by connecting passage 31 and the lefthand portion of passage 30 in one position. In another position of valve 32, the lefthand portion of passage 30 is isolated, and, simultaneously, passage 29, the righthand end portion of passage 30, and passage 31 are connected to establish communication between inlet port 18 and the underside of piston 27.

Valve 32 is solenoid operated and is urged to the position shown in Fig. 2 by a biasing spring 33. Valve operating solenoid 34 is suitably connected to valve stem 35 for causing valve 32 to move to said other position described above. A detent portion 36 provided in valve stem 35, is engaged by a rod 37 when valve 32 is moved to said other position. A biasing spring 38 is provided for urging rod 37 into engagement with the detent 36 in valve stem 35 to insure engagement with detent 36 when valve 32 is moved to its lefthand position. A solenoid 39 is suitably secured to rod 37 for causing it to move out of engagement with detent 36.

Solenoids 34, 39 have terminals 40 and 41, respectively, which are connected to ground potential. Other terminals 42, 43 of solenoids 34 and 39, respectively, are connected to contacts 44, 45 of switch 46. Switch 46 is provided with another contact 47 which is connected to a source of voltage such as a battery 48. As illustrated in the drawings, switch 46 is of the well-known three position type. That is, in one position, electrical connection is established by the switch contacts 44 and 47, and another position, electrical connection is established between contacts 45 and 47, and in a third or off position, electrical connection is interrupted between contacts 44, 45, and 47.

In order to provide automatic closure of valve 16 when the pressure of the injection fluid in conduit 10 is less than a preselected value, a pressure switch 49 having contacts 50, 51 connected in series with switch contacts 45 and 47, is provided. Switch 49 includes a pressure sensing element such as bellows 52 connected to conduit 10 by a branch conduit 53. A rod 54 carrying an electrical conductor 55 is suitably secured to bellows 52. Conductor 55 is biased to establish connection between contacts 50, 51 when the pressure within bellows 52 is less than said preselected value. Bellows 52 itself may provide this bias, or if desired, separate spring means (not shown) may be provided.

To initiate operation of the fluid injection system, the operator manipulates switch 46 so as to establish connection between contacts 44 and 47, thus energizing solenoid 34. When solenoid 34 is energized, its armature moves to the left against the bias of spring 33 carrying with it valve 32, valve stem 35 and detent 36, and thereby admits compressor discharge air from conduit 15 and inlet port 18 to the underside of piston 27. Since the compressor discharge air is at a pressure considerably greater than that of the atmosphere, piston 27 and valve 22 are pushed upward against the action of biasing spring 23. When valve 22 is open, communication is established between inlet and discharge ports 18 and 19, and the compressor air is thereby caused to flow through conduit 15 and set turbine 13 and pump 9 in operation. The operator continues to hold switch 46 in a position to maintain connection between contacts 44 and 47 until such time as pump 9 has been accelerated to its normal operating speed and has developed its normal operating pressure. When this preselected operating pressure has been attained, the action of this pressure acting on bellows 52 causes conductor 55 to move out of engagement with contacts 50, 51 so that solenoid 34 is de-energized. When solenoid 39 is de-energized and since solenoid 34 is energized by the operator's action, either by the disengagement of conductor 55 from contacts 50, 51, following the expansion of bellows 52, as a result of pressure build-up in conduit 10, or when contact 47 is not touching contact 45, the action of biasing spring 38 forces rod 37 into engagement with detent 36, thus locking valve 32 in its lefthand position and insuring that compressor discharge pressure is maintained against the underside of piston 27 to hold valve 22 in its open position. When the pressure of the injection fluid in conduit 10 has attained the preselected value, valve 22 will be held in its open position in the manner described above and the operator can return the switch 46 to the off-position illustrated in Fig. 2.

If the operator decides to discontinue operation of the fluid injection system, switch 46 is manipulated to establish electrical connection between contacts 45 and 47, thereby energizing solenoid 39. When solenoid 39 is energized, its armature moves downward against the action of biasing spring 38 and thus rod 37 is caused to move out of engagement with detent 36. When the stem 35 of valve 32 is released by rod 37, the action of biasing spring 33 causes valve 32 to move quickly to the position shown in Fig. 2, thereby interrupting the supply of compressor discharge air under pressure from the underside of piston 27 and at the same time connecting the underside of piston 27 to the atmosphere through passage 31 and the lefthand portion of passage 30. Once the compressor discharge air under pressure has been removed from the underside of piston 27, there is no longer any opposition to the action of biasing spring 23 which then causes valve 22 to move quickly to its closed position, and thus discontinue the operation of turbine 13 and pump 9.

In addition to manual control by the operator, pump 9 and turbine 13 are automatically shut down if the fluid pressure delivered by the pump falls below the preselected value for any reason. A reduction in the pump delivery pressure will allow bellows 52 to collapse, and thus allow conductor 55 to establish connection between pressure switch contacts 50, 51. As previously indicated, when connection is established between contacts 50, 51, solenoid 39 is energized and rod 37 is moved out of engagement with detent 36, thus causing valve 22 to close quickly in the manner described above. Pressure switch 49 thus anticipates complete consumption of the fluid supply in reservoir 7, and pump 9 and turbine 13 are automatically protected against destructive overspeeds which might result if the pump were operated without load, by quickly cutting off the flow of motive fluid to the turbine.

Referring now to Figs. 3, 4, a modified valve structure is controlled by solenoids 34, 39 in the manner described above. A gate or butterfly type of valve means 22a is provided in casing 17. Valve 22a is rotatably supported in the casing by a shaft 28a extending through the casing walls, as indicated in Fig. 3. Biasing spring 23 of Fig. 2 is replaced by a spiral spring 23a, similar to those used in clocks, secured to shaft 28a. A retaining bracket 56 is secured to the outer end portion of spring 23a and to casing 17.

Piston 27 is replaced by a vane or plate member 27a which is secured at one end to the righthand end portion of shaft 28a. Vane 27a will thus rotate to a limited degree with respect to the axis of shaft 28a. A portion of casing 17 is provided with a cylindrical inner surface 57 forming a close clearance with the end portion of vane 27a at any point within the limits of movement thereof. Passages 29, 30, and 31a are provided within casing 17 and cooperate with valve 32 to establish communication either between inlet port 18 and the upper surface of vane 27a, or between the upper surface of vane 27a and the atmosphere in the same manner as described in connection with Fig. 2.

Operation of the valve device is substantially in accordance with the operation described in connection with Fig. 2. The operator energizes solenoid 34 to cause valve 32 to move to its upper position (not shown in Figs. 3 and 4) and thus establish communication between inlet port 18 and the upper surface of vane 27a through passages 29, 30, and 31a. Air under pressure from the compressor is thereby admitted to the upper surface of vane 27a and thus causes the vane to rotate in a clockwise direction (Fig. 4) and open valve 22a against the action of biasing spring 23a. Biasing spring 33 urges valve 32 in a direction to isolate passage 29 and to establish communication between passages 30, 31a and the atmosphere. Valve 32 is caused to remain in its upper position, or is released therefrom by the action of rod 37, detent 36, solenoid 39, and spring 38 operating in the same manner as described in connection with Fig. 2.

A still further modification of the valve device and the operating means therefor is illustrated in Fig. 5. In Fig. 5, a valve casing 17 having inlet and discharge ports 18 and 19 connected by a passage 20 is provided as in the preceeding figures. A gate or butterfly type of valve 22a is rotatably supported by a shaft 28a for establishing or interrupting communication between ports 18, 19. A piston 27 having a piston rod 28 is slidably supported in a cylinder 21 for opening valve 22a against the action of biasing spring 23 as in the previous cases. A clevis 58 is suitably secured to piston rod 28 and is connected by a pin 59 to a crank member 60 which is secured to the lefthand end of shaft 28a. Communication is established between piston 27 and conduit 15 or inlet port 18 by connecting passages 29–31. In this modification of the invention, however, passage 30 is contained within a movable portion of a two-way valve 61. As shown in Fig. 5, valve 61 is in a position for establishing communication between cylinder 21 and conduit 15 through connecting passages 29–31. In the other position of valve 61 (not shown), valve passage 30 isolates passage 29 and establishes communication between cylinder 21 and the ambient atmosphere.

Holding and/or releasing means for valve 22a include a second piston 62 slidably supported in a cylinder 63 provided in casing 17. Piston 62 has a rod member 64 secured thereto and connected to the righthand end portion of shaft 28a in the same manner in which rod 28 is connected to shaft 28a. Communication is established between cylinder 63 and conduit 10 by branch conduit portions 53a, 53b. A second two-way valve 61a having a passage 65 is included in series with conduit portions 53a, 53b, so that the operator can cause valve 22a to close at any desired time. The normal operating position of valve 61a is as shown in Fig. 5 with conduit 53a, valve passage 65, and conduit portion 53b connected in series flow relation to establish communication between conduit 10 and cylinder 63. In the other position of valve 61a (not shown), communication between conduit 10 and cylinder 63 is interrupted and communication established between cylinder 63 and the ambient atmosphere through conduit portion 53b and passage 65.

Referring now to Figs. 1 and 5, when the operator desires to set pump 9 and turbine 13 in operation, valve 61a is adjusted to its normal operating position as shown in Fig. 5, and valve 61 is adjusted to establish communication between passages 29 and 31, thus admitting air under pressure to cylinder 21. The pressurized air from conduit 15 acting on piston 27 causes valve 22a to open against the action of biasing spring 23 and thus allows air from the compressor to flow through passage 20 and conduit 15 for driving the turbine 13. Valve 61 is allowed to remain in the position shown in Fig. 5 until sufficient time has elapsed for pump 9 to deliver injection fluid at normal operating pressure to conduit 10. Since conduit 10 is connected to cylinder 63 by branch conduits 53a and 53b, the pressure of the fluid delivered to the powerplant will be communicated to piston 62. This pressure acting upon piston 62 is sufficient to hold valve 22a in its open position against the action of biasing spring 23. At this time, the operator turns valve 61 to its other position so as to interrupt communication between piston 27 and conduit 15 and vent cylinder 21 to the atmosphere. If the pressure in conduit 10 falls below a preselected value, the pressure acting on piston 62 will be insufficient to hold valve 22a in its open position, and the action of biasing spring 23 will quickly and automatically return the valve to its closed position and thus prevent pump 9 and turbine 13 against destructive overspeeds. If the operator desires to discontinue operation of pump 9 and turbine 13 before the supply of injection fluid has been entirely consumed, valve 61a is moved to its other position (not shown in Fig. 5) to interrupt communication between cylinder 63 and conduit 10 and to vent cylinder 63 to the atmosphere. As soon as the pressure acting on piston 62 falls below the above-mentioned preselected value, the action of biasing spring 23 will automatically return valve 22a to its closed position, thus discontinuing operation of the turbine and pump.

While particular embodiments of the invention have been illustrated and described, it will be obvious to those skilled in the art that various changes and modifications may be made without departing from the invention and it is intended to cover in the appended claims all such changes and modifications as come within the true spirit and scope of the invention.

What I claim as new and desire to secure by Letters Patent of the United States is:

1. In a fluid distribution system comprising first conduit means for conveying a first fluid under pressure, apparatus for controlling the flow of said first fluid including second conduit means for conveying a second fluid under pressure, first valve means within said second conduit means for restraining the flow of said second fluid therethrough, means for biasing said first valve means to closed position for preventing fluid flow through said second conduit means, means including a servomotor for opening said first valve means in communication with said second conduit means by passages, electrically controlled means including a second valve in said passages for governing flow therethrough of said second fluid, manually operated means for completing an electrical circuit with said electrically controlled means, electrically releasable holding means for engaging said second valve when said electrically controlled means is energized for allowing unrestricted fluid flow through said passages, and means for making an electrical connection for disengagement of said holding means from said second valve.

2. In a fluid distribution system as set forth in claim 1, said last-mentioned means being manually operated switch means.

3. In a fluid distribution system as set forth in claim 1, said last-mentioned means being responsive to pressure in said first conduit means and making an automatic electrical connection to disengage said holding means upon decrease of pressure in said first conduit means below a predetermined value.

4. In a fluid distribution system including first conduit means for conveying a first fluid under pressure, means for regulating fluid flow in said first conduit means comprising second conduit means for conveying a second fluid under pressure, a first valve means within said second conduit means, means for biasing said first valve means to closed position, means including a servomotor, for opening said first valve means, in communication with said second conduit means at the upstream side of said first valve means through passages, control means in said passages for permitting flow of said second fluid therethrough when in a first position and for interrupting said flow of said second fluid when in a second position, means for biasing said control means toward said second position, manually actuated solenoid means for moving said control means to said first position, and electrically operated means including a device responsive to pressure in said first conduit means for holding automatically said control means in said first position when said pressure in said first conduit means reaches a preselected value and for releasing automatically said control means when said pressure in said first conduit means becomes less than said preselected value.

5. A fluid distribution system for a thermal powerplant comprising a pump, first conduit means connecting the pump to the powerplant for conveying thereto a first fluid under pressure, a turbine connected to and adapted to drive said pump, means including a valve for establishing communication between the turbine and the powerplant and for controlling the flow of a second fluid from the powerplant to the turbine, means biasing said valve to closed position, means including a servomotor for opening said valve and adapted to hold said valve in open position when the pressure of the fluid delivered by the pump reaches a preselected value, and means responsive to the said delivered pressure connected to the said holding means to release said valve when said pressure becomes less than a said preselected value.

References Cited in the file of this patent

UNITED STATES PATENTS

| 844,923 | Cridge | Feb. 19, 1907 |
| 1,095,935 | Sheldon | May 5, 1914 |
| 1,300,301 | Smith | Apr. 15, 1919 |
| 1,416,791 | Cockburn et al. | May 23, 1922 |
| 2,019,766 | Peterson | Nov. 5, 1935 |
| 2,288,912 | Mears | July 7, 1942 |
| 2,339,352 | Ray | Jan. 18, 1944 |
| 2,398,775 | Beekley et al. | Apr. 23, 1946 |
| 2,447,388 | Baak | Aug. 17, 1948 |
| 2,454,038 | Crever | Nov. 16, 1948 |
| 2,520,434 | Robson | Aug. 29, 1950 |
| 2,531,761 | Zucrow | Nov. 28, 1950 |
| 2,551,229 | Alford et al. | May 1, 1951 |
| 2,559,623 | Holmes | July 10, 1951 |
| 2,606,420 | Moore | Aug. 12, 1952 |